(12) United States Patent
Lin et al.

(10) Patent No.: US 7,602,761 B2
(45) Date of Patent: Oct. 13, 2009

(54) CALL ACCESS CONTROL METHOD

(75) Inventors: Zhaohui Lin, Shenzhen (CN); Xuezhi Yang, Shenzhen (CN); Wenbo Wang, Shenzhen (CN)

(73) Assignee: Huawei Technologies, Co. Ltd., Shenzhen (CN)

( * ) Notice: Subject to any disclaimer, the term of this patent is extended or adjusted under 35 U.S.C. 154(b) by 340 days.

(21) Appl. No.: 10/523,697

(22) PCT Filed: Jul. 10, 2003

(86) PCT No.: PCT/CN03/00548

§ 371 (c)(1),
(2), (4) Date: Nov. 7, 2005

(87) PCT Pub. No.: WO2004/016023

PCT Pub. Date: Feb. 19, 2004

(65) Prior Publication Data

US 2006/0105773 A1    May 18, 2006

(30) Foreign Application Priority Data

Aug. 7, 2002    (CN) ............................. 02 1 26005

(51) Int. Cl.
*H04B 7/212* (2006.01)
(52) U.S. Cl. .................. 370/347; 370/329; 370/328; 370/338; 455/450; 455/522
(58) Field of Classification Search ............. 370/347, 370/329, 328, 338; 455/450, 522
See application file for complete search history.

(56) References Cited

U.S. PATENT DOCUMENTS 5,818,818 A * 10/1998 Soumiya et al. ............ 370/252

6,078,959 A * 6/2000 Wright et al. ............... 709/227

(Continued)

FOREIGN PATENT DOCUMENTS

CN    1227037    8/1999

(Continued)

OTHER PUBLICATIONS

Katzela, I. et al., "Channel Assignment Schemes for Cellular Mobile Telecommunication Systems: A Comprehensive Survey", IEEE Personal Communications, Jun. 1996, pp. 10-31.

(Continued)

*Primary Examiner*—Nghi H Ly
(74) *Attorney, Agent, or Firm*—Rothwell, Figg, Ernst & Manbeck, PC

(57) ABSTRACT

The present invention discloses a call access control (CAC) method applicable to call access during call initiation and cell switching in TDD-CDMA mobile communication system. The method comprises: counting the number of accessed subscribers in all current communication time slots of the home base station for an access request from a new subscriber, to determine channel resource occupations in different time slots; comparing the channel resource occupations in the different time slots, and then allocating idle resource units in the time slots having available channel resources and the minimum number of accessed subscribers to the subscriber sending the access request. The present invention achieves dynamic allocation of channel resources in cells and have an advantage of simple implementation and applicability.

24 Claims, 1 Drawing Sheet

U.S. PATENT DOCUMENTS

| | | | |
|---|---|---|---|
| 6,694,348 B1 * | 2/2004 | Mizuhara | 709/201 |
| 6,963,540 B2 * | 11/2005 | Choi et al. | 370/252 |
| 2001/0004599 A1 * | 6/2001 | Dokko | 455/452 |

FOREIGN PATENT DOCUMENTS

| | | | |
|---|---|---|---|
| EP | 0 654 952 A2 | 5/1995 | |
| EP | 0654952 A2 | 5/1995 | |
| EP | 0858235 A1 | 8/1998 | |

OTHER PUBLICATIONS

Chen, P. et al., "Chapter 3: Modified LP-DDCA with Double-Threshold Guard Channel Scheme", Modified LP-DDCA for Integrated Service over Cellular System, Department of Communication Engineering, National Chiao Tung University, Taiwan, R.O.C., Jun. 15, 2000, 54 pages.

* cited by examiner

CALL ACCESS CONTROL METHOD

CROSS-REFERENCE TO RELATED APPLICATION

This application is a National Phase of International Application Serial No. PCT/CN03/00548, filed Jul. 10, 2003.

FIELD OF THE INVENTION

The present invention relates to a method of dynamic allocation of radio channel resources in mobile communication field, particularly to a call access control method during call initiation or cell switching in TDD CDMA mobile communication system.

BACKGROUND OF THE INVENTION

For 3G mobile communication systems, the call access control policy put forth in the standard document mainly uses a concentrated call access control algorithm in RNC to allocate channel resources according to the current load of the communication system as well as QoS demands of the calling subscriber. Since the processing and implementation of the concentrated call access control algorithm is in the RNC, which is on a higher level in the mobile network hierarchy, sophisticated signaling support between RNC and UE and between RNC and Node_B in the system is required. Therefore, the algorithm is complex in operation and difficult to implement.

SUMMARY OF THE INVENTION

An object of the present invention is to provide a simple and effective call access control method based on counting of accessed subscriber, to implement dynamic allocation of channel resources of the base station.

The technical solution of the present invention is applicable to call access control during call initiation and cell switching, comprising the following steps:

1) counting the number of accessed subscribers in all current communication time slots of the home base station for an access request, to determine channel resource occupations in different time slots;

2) comparing said channel resource occupations in the different time slots, and then allocating idle resource units in the time slots having available channel resources and the minimum number of accessed subscribers to the subscriber sending the access request.

In said technical solution:

Said access request is a call access request sent from a new mobile subscriber to the home base station or a call switching request sent from a mobile subscriber to its adjacent cells.

Said counting in step 1) refers to: arranging corresponding counters for different time slots respectively, so that the number of counters are equal to the maximum number of communication time slots that can be supported by the base station; counting accessed subscribers in the time slots, and increasing the corresponding counter by 1 if the current resource unit is occupied; otherwise increasing it by 0.

Step 2) comprises:

a) comparing channel resource occupations in all uplink time slots, and allocating the idle resource unit in uplink time slots having available channel resource and the minimum number of accessed subscribers to the new subscriber sending the access request as an uplink channel; if the idle resource unit is allocated successfully, going to step b), otherwise going to step c);

b) comparing channel resource occupations in all downlink time slots, and allocating the idle resource unit in downlink time slots having available channel resources and the minimum number of accessed subscribers to the new subscriber sending the access request as a downlink channel;

c) returning a response signal to the call access request according to the channel resource allocations in the uplink and downlink time slots.

Step a) comprises:

comparing all counters storing the count value of accessed subscribers in the uplink time slots one by one, and selecting a counter with the minimum count value in the uplink time slots;

comparing said count value in the counter with the threshold (i.e., the maximum number) of subscribers to be accessed per time slot supported by the base station; if the count value stored in the counter is smaller than the threshold, allocating an idle resource unit in the uplink time slots corresponding to the counter as an uplink channel to the new subscriber sending the access request; otherwise indicating the failed allocation.

Step b) comprises:

comparing all counters storing the count value of accessed subscribers in the downlink time slots one by one, and selecting a counter with the minimum count value in the downlink time slots;

comparing said count value in the counter with the threshold (i.e., the maximum number) of subscribers to be accessed per time slot supported by the base station; if the count value stored in the counter is smaller than the threshold, allocating an idle resource unit in the downlink time slots corresponding to the counter as a downlink channel to the new subscriber sending the access request; otherwise indicating the failed allocation.

Step c) refers to: when the channel resources in the uplink and downlink time slots are both allocated successfully, returning a message to the mobile station sending the access request to indicate the succeeded access, or returning a message to the mobile station sending the cell switching request to indicate the succeeded cell switching; otherwise returning a message to the mobile station sending the access request to indicate the failed access, or returning a message to the mobile station sending the cell switching request to indicate the failed cell switching.

The threshold (i.e., the maximum number) of subscribers to be accessed per time slot supported by the base station is 6~8, and is determined during initialization.

Compared with the concentrated call access control algorithm implemented in the RNC at higher level, the method of the present invention is implemented in the home base station processing a call access request sending from a subscriber, and the allocation of channel resources can be performed flexibly in a local area, simplifying signaling switching greatly. The implementation of the method is relatively simple and doesn't require complex operation. With the method, channel resources with lower system interference may be allocated dynamically to subscribers sending the call request. Since the present invention also takes account into interference from other cells and maintains an effective call access control (CAC) threshold N, so as to reduce interference of new subscribers to the system and guarantee QOS demand of subscribers to be accessed; therefore, it can improve system capacity effectively.

DETAILED DESCRIPTION OF THE EMBODIMENT

Figure 1:
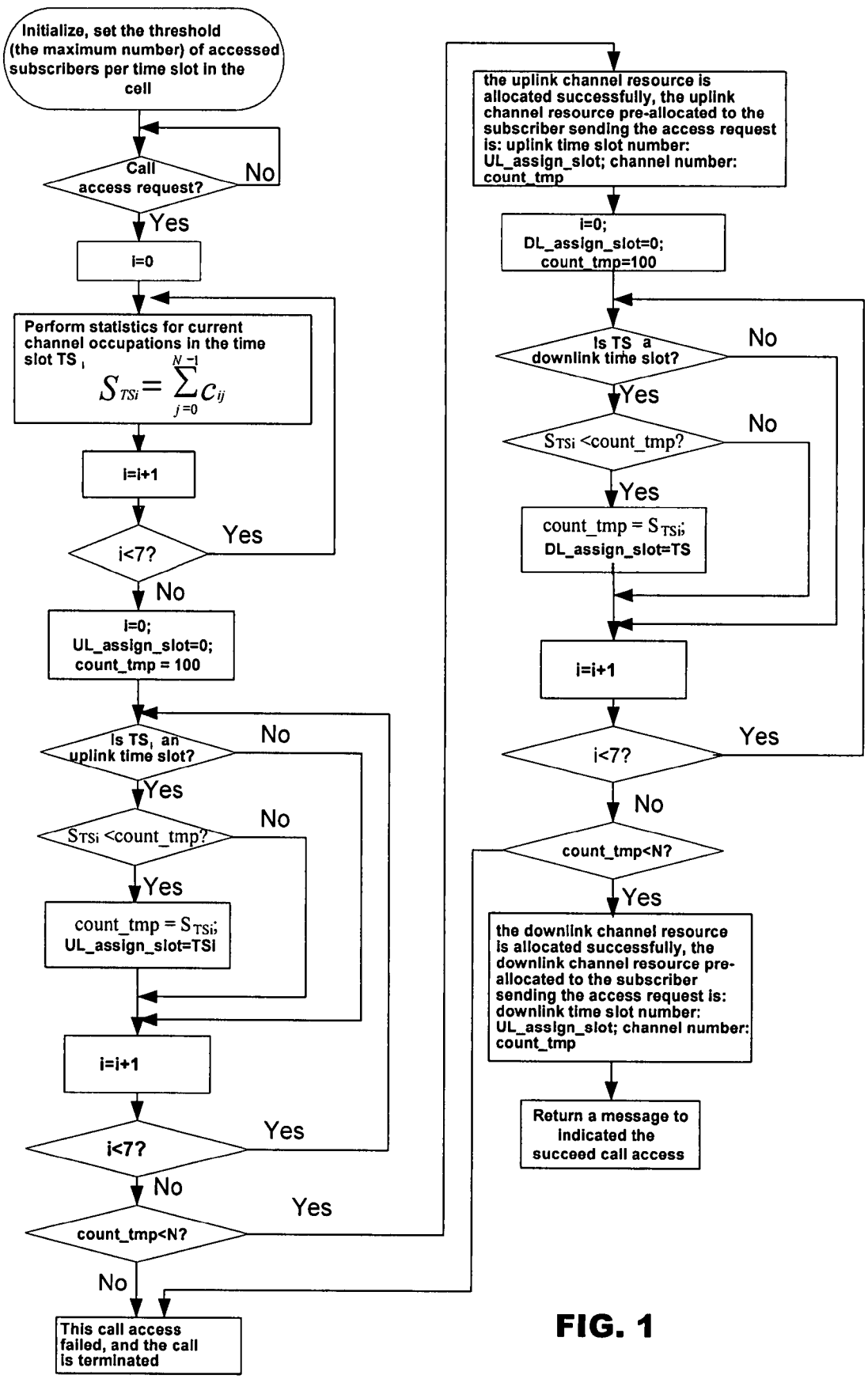
FIG. 1 is a flow chart of the call access control method of the present invention.

The embodiment is described taking the access call initiated by a new mobile subscriber to the home base station as an example.

The method of the present invention comprises: counting the number of accessed subscribers in all current communication time slots of the home base station for an access request, to determine channel resource occupations in different time slots; then comparing said channel resource occupations in the different time slots, and then allocating idle resource units in the time slots having available channel resources and the minimum number of accessed subscribers to the subscriber sending the access request. Therefore, dynamic allocation of base station channel resources can be implemented.

For example, in the low data rate (1.28 Mchips) TD-SCDMA mobile communication system as shown in FIG. 1, it is set that there are totally 7 uplink and downlink time slots available for communication. When the flow shown in FIG. 1 is applied to a high data rate (3.84 Mchips) TDD system, the total number of uplink and downlink time slots may be modified to 15; Cij in the flow chart represents the state of current channels being searched (may be 0 or 1, 0 for idle, and 1 for occupied); TSi represents time slot number; STSi represents the counter used to count accessed subscribers corresponding to time slot TSi; N represents the threshold (i.e., the maximum number) of subscribers to be accessed per time slot.

A sub-frame in TD-SCDMA comprises 7 time slots for communication, which are used to transfer uplink (UL) and downlink (DL) traffic; according to a protocol, a time slot can support up to 16 subscriber channels simultaneously; thus a carrier frequency/time slot/channel constitutes a resource unit (RU); under interference from other cells, the Call Access Control (CAC) access threshold N (i.e., the maximum number) of subscribers to be accessed in a time slot must be smaller than the maximum number of channels that are supported in a current time slot. As a design parameter, threshold N may be adjusted as required in system design (6~8 is preferred) and is determined during initialization.

Please see the flow chart shown in FIG. 1, when a new subscriber is to be added, the home base station that receives the access request searches the state of channel resources in the 7 time slots and performs counting for channel occupation in all uplink and downlink time slots. Corresponding counters is arranged for different time slots and stores the subscriber counting result. If a resource unit is occupied currently, it increases the counter by 1; if the resource unit is idle, it increases the counter by 0. After obtaining the statistical results, the base station compares the statistical results in the uplink (UL) time slots, and, on the premise that the counter value is lower than the Call Access Control (CAC) access threshold N, it allocates the channel resource unit in the uplink time slots with the minimum count value as an uplink channel resource to the requesting subscriber. After the uplink channel resource is allocated successfully, it controls the allocation of channel resource in downlink time slots. It compares the statistical result in downlink (DL) time slots, and, on the premise that the counter value is lower than the Call Access Control (CAC) access threshold N, it allocates the channel resource unit in the downlink time slots with the minimum counter value as a downlink channel resource to the requesting subscriber, so that the time slots with the minimum co-channel interference are allocated to the new calling subscriber, to implement dynamic radio resource allocation.

In allocation principle described above, the Call Access Control (CAC) is successful only when both uplink and downlink meet the constraint conditions, and in this case, the base station will return a message to the requesting mobile station to indicate the access is successful; otherwise the base station will return a message to the requesting mobile station to indicate the failed access. In the call access control method of the present invention, the selection of the threshold N of subscribers to be accessed is crucial; the base station that performs resource searching and allocation must maintain an effective CAC access threshold N; whereas the threshold (i.e., the maximum number) of subscribers to be accessed per time slot N is the result of compromising between GoS (Grade Of Service) and QoS (Quality Of Service). Under interference from other cells, the threshold N of subscriber to be accessed must be lower than the maximum number of channels that can be supported by the current time slot.

The method of the present invention is applicable to not only the access call of a new subscriber but also the switching call between adjacent cells; whatever the call is, it involves searching for and allocating channel resources and has no essential difference in regard to the call access control (CAC) principle. When a mobile subscriber in calling moves into an adjacent cell, the home cell changes. To meet the requirement for call quality and level, the mobile subscriber will send a switching call request to the current home cell; when receiving the switching call request, the current home cell executes the same method and steps as those for the access call of a new mobile subscriber initiated to a home base station; if the channel resources are allocated successfully, the home base station returns a message to the mobile subscriber to indicate the succeeded switching call access; otherwise it returns a message to indicate the failed switching call access.

The invention claimed is:

1. A call access control method during call initiation or cell switching in a TDD CDMA mobile communication system, comprising the following steps:
  (1) counting the number of accessed subscribers in all current communication time slots of a home base station for an access request, to determine channel resource occupations in different time slots; and
  (2) comparing said channel resource occupations in the different time slots, and then allocating idle resource units, in the time slots having available channel resources and a minimum number of accessed subscribers, to the subscriber sending the access request.

2. The method according to claim 1, wherein said access request in step (1) refers to an access call sent from a new mobile subscriber to the home base station.

3. The method according to claim 1, wherein said access request in step (1) refers to a switching call sent from a mobile subscriber to adjacent cells.

4. The method according to claim 1, wherein the counting in step (1) comprises:
  arranging corresponding counters for different time slots respectively, so that the number of counters are equal to the maximum number of time slots for communication that can be supported by the base station;

counting accessed subscribers in the time slots, and increasing the corresponding counter by 1 if the current resource unit is occupied; otherwise increasing it by 0.

5. The method according to claim 1, wherein step (2) comprises:
   a) comparing channel resource occupations in all uplink time slots, and allocating the idle resource unit in uplink time slots having available channel resource and the minimum number of accessed subscribers to the new subscriber sending the access request as an uplink channel;
   if the idle resource unit is allocated successfully, going to step b), otherwise going to step c);
   b) comparing channel resource occupations in all downlink time slots, and allocating the idle resource unit in downlink time slots having available channel resources and the minimum number of accessed subscribers to the new subscriber sending the access request as a downlink channel;
   c) returning a response signal to the call access request according to the channel resource allocations in the uplink and downlink time slots.

6. The method according to claim 5, wherein step a) comprises:
   comparing all counters storing the count value of accessed subscribers in the uplink time slots one by one, and selecting a counter with the minimum count value in the uplink time slots;
   comparing said count value in the counter with the threshold of subscribers to be accessed per time slot supported by the base station;
   if the count value stored in the counter is smaller than the threshold, allocating an idle resource unit in the uplink time slots corresponding to the counter as an uplink channel to the new subscriber sending the access request; otherwise indicating the failed allocation.

7. The method according to claim 5, wherein step b) comprises:
   comparing all counters storing the count value of accessed subscribers in the downlink time slots one by one, and selecting a counter with the minimum count value in the downlink time slots;
   comparing said count value in the counter with the threshold of subscribers to be accessed per time slot supported by the base station; if the count value stored in the counter is smaller than the threshold, allocating an idle resource unit in the downlink time slots corresponding to the counter as a downlink channel to the new subscriber sending the access request; otherwise indicating the failed allocation.

8. The method according to claim 6, wherein the threshold of subscribers to be accessed per time slot supported by the base station is 6~8, and is determined during initialization.

9. The method according to claim 7, wherein the threshold of subscribers to be accessed per time slot supported by the base station is 6~8, and is determined during initialization.

10. The method according to claim 5, wherein step c) refers to:
    when the channel resources in the uplink and downlink time slots are both allocated successfully, returning a message to the mobile station sending the access request to indicate the succeeded access; otherwise returning a message to the mobile station sending the access request to indicate the failed access.

11. The method according to claim 5, wherein the channel resources in the uplink and downlink time slots are both allocated successfully, or returning a message to the mobile station sending the cell switching request to indicate the succeeded cell switching; otherwise returning a message to the mobile station sending the cell switching request to indicate the failed cell switching.

12. The method of claim 6 wherein said threshold of subscribers is a maximum number of subscribers.

13. The method of claim 7 wherein said threshold of subscribers is a maximum number of subscribers.

14. The method of claim 8 wherein said threshold of subscribers is a maximum number of subscribers.

15. The method of claim 9 wherein said threshold of subscribers is a maximum number of subscribers.

16. A base station in a TDD CDMA mobile communication system, comprising:
    a first unit adapted to count the number of accessed subscribers in all current communication time slots of the base station in response to an access request to determine channel resource occupations in the time slots;
    a second unit adapted to compare said channel resource occupations in the time slots and allocate idle resource units in the time slots that have available channel resources and a minimum number of accessed subscribers to the subscriber.

17. The base station according to claim 16, wherein said access request is an access call sent from a mobile subscriber to the base station.

18. The base station according to claim 16, wherein said access request is a switching call sent from a mobile subscriber to adjacent cells.

19. The base station according to claim 16, wherein said counting the number of accessed subscribers comprises:
    arranging corresponding counter for different time slot respectively, so that the number of the counters equals to the maximum number of time slots for communication that can be supported by the base station; and
    counting accessed subscribers in the time slots, and increasing the corresponding counter by 1 if the current resource unit is occupied.

20. The base station according to claim 16, wherein said comparing said channel resource occupations and allocating idle resource units comprises:
    comparing channel resource occupations in all uplink time slots, and allocating the idle resource unit in uplink time slot, that has available channel resource and the minimum number of accessed subscribers, to a subscriber that sent the access request as an uplink channel; and
    if the idle resource unit is allocated successfully, comparing channel resource occupations in all downlink time slots, and allocating the idle resource unit in the downlink time slot, that has available channel resources and the minimum number of accessed subscribers, to the subscriber that sent the access request as a downlink channel;
    otherwise returning a response signal to the call access request according to the channel resource allocations in the uplink and downlink time slots.

21. The base station according to claim 20, wherein said comparing channel resource occupations in all uplink time slots and said allocating the idle resource unit in the uplink time slot comprises:
    comparing all counters storing the count value of accessed subscribers in the uplink time slots, and selecting a counter with the minimum count value; and
    comparing said count value with a threshold, and, if the count value is smaller than the threshold, allocating an idle resource unit in the uplink time slot corresponding to the counter as an uplink channel to the subscriber that sent the access request, wherein the threshold is a number of subscribers to be accessed per time slot supported by the base station.

22. The base station according to claim 20, wherein said comparing channel resource occupations in all downlink time slots and allocating the idle resource unit in the downlink time slot comprises:
   comparing all counters storing the count value of accessed subscribers in the downlink time slots, and selecting a counter with the minimum count value in the downlink time slots; and
   comparing said count value in the counter with the threshold of subscribers to be accessed per time slot supported by the base station, and, if the count value stored in the counter is smaller than the threshold, allocating an idle resource unit in the downlink time slot corresponding to the counter as a downlink channel to the subscriber which sent the access request.

23. The base station according to claim 20, wherein said returning a response signal to the call access request according to the channel resource allocations in the uplink and downlink time slots comprises returning a message to the mobile station that sent the access request to indicate the successful access when the channel resources in the uplink and downlink time slots are both allocated successfully, otherwise, returning a message to the mobile station that sent the access request to indicate failed access.

24. The base station according to claim 20, wherein the process of returning a response signal to the call access request according to the channel resource allocations in the uplink and downlink time slots comprises when the channel resources in the uplink and downlink time slots are both allocated successfully, returning a message to the mobile station that sent the cell switching request to indicate the succeeded cell switching, otherwise, returning a message to the mobile station that sent the cell switching request to indicate failed cell switching.

* * * * *